US006328348B1

(12) United States Patent
Cornford et al.

(10) Patent No.: US 6,328,348 B1
(45) Date of Patent: Dec. 11, 2001

(54) HOSE COUPLING

(75) Inventors: Arthur Selwyn Cornford, Mississauga; Stanley Robert Elsdon, Etobicoke; Gordon Elford Fairles, Toronto, all of (CA)

(73) Assignee: Emco Wheaton Fleet Fueling, Corp., Oakville (CA)

( * ) Notice: Subject to any disclaimer, the term of this patent is extended or adjusted under 35 U.S.C. 154(b) by 0 days.

(21) Appl. No.: 09/168,999

(22) Filed: Oct. 9, 1998

(51) Int. Cl.[7] ............................................. F16L 37/18
(52) U.S. Cl. .......................... 285/316; 285/315; 285/305
(58) Field of Search ............................... 285/38, 316, 315

(56) References Cited

U.S. PATENT DOCUMENTS

| 2,548,528 | * | 4/1951 | Hansen | 285/316 |
|---|---|---|---|---|
| 2,888,278 | | 5/1959 | Torres et al. . | |
| 3,662,793 | | 5/1972 | Calisher et al. . | |
| 3,674,061 | | 7/1972 | Calisher et al. . | |
| 3,779,586 | * | 12/1973 | Rossiter | 285/316 |
| 4,485,845 | * | 12/1984 | Brady | 285/316 |
| 5,947,071 | * | 9/1999 | Alcamo | 285/38 |
| 6,062,606 | * | 5/2000 | Carpini et al. | 285/38 |

* cited by examiner

Primary Examiner—Teri Pham Luu
(74) Attorney, Agent, or Firm—Crowell & Moring LLP

(57) ABSTRACT

A novel hose coupling for a liquid transfer system is provided. The coupling comprises a connector portion adapted to lockingly engage an adapter on a receptacle, such as a gas tank, and a handle portion. The handle is proximate to a releasing member which is oriented for manipulation by a hand holding the handle. The releasing member is moveable between a first engaged position in which the coupling is lockingly engaged with a receptacle adapter and a second disengaged position in which the coupling is released from locking engagement with the adapter. Accordingly, the coupling is disengaged from locking engagement with the adapter when the release member is displaced from the engaged position to the disengaged position. The coupling allows one-handed, ambidextrous use, providing a coupling operator with greater maneouverability which is advantageous particularly in instances where receptacle access is limited.

14 Claims, 3 Drawing Sheets

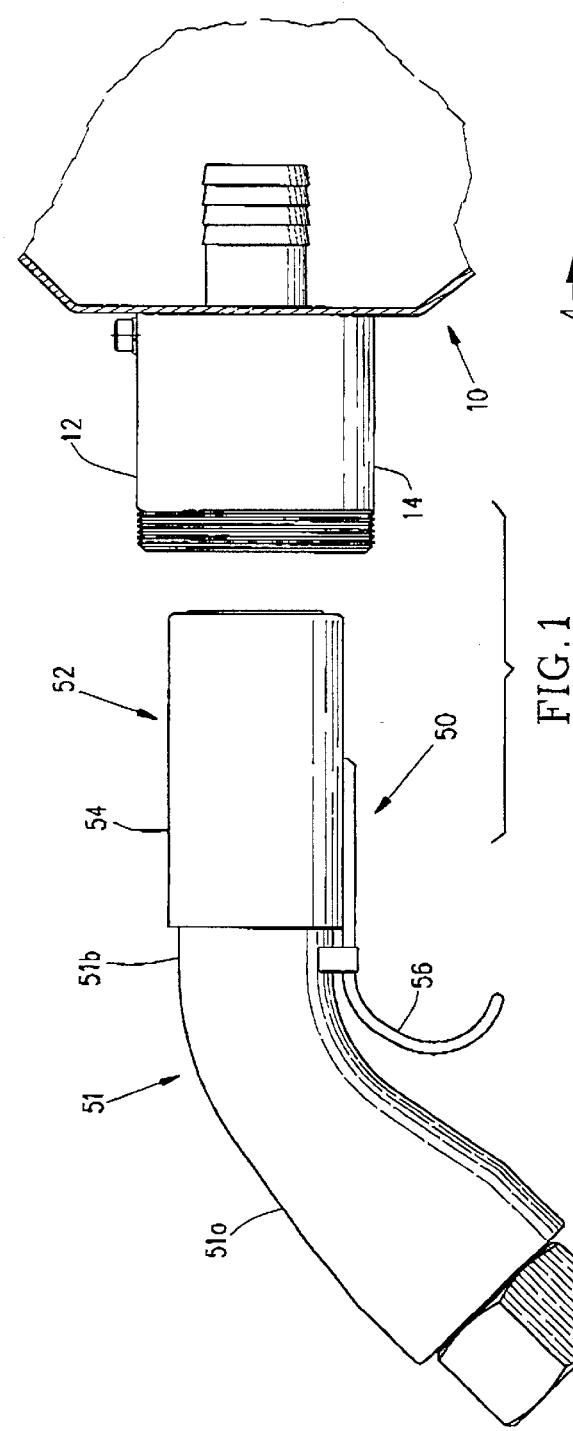
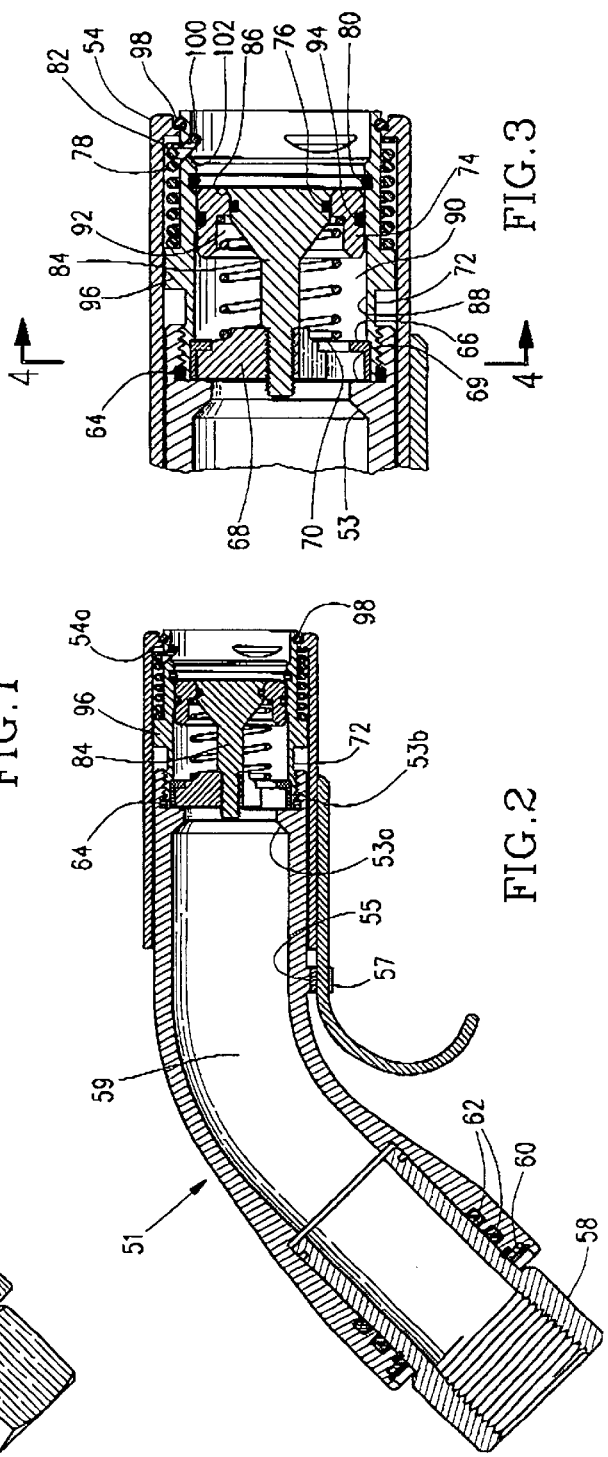

HOSE COUPLING

FIELD OF THE INVENTION

The present invention relates to a novel hose coupling or nozzle useful for the delivery of liquid to a receptacle. In particular, the present invention relates to a hose coupling which advantageously allows for single-handed, ambidextrous operation.

BACKGROUND OF THE INVENTION

Hose couplings for liquid transfer are well known, particularly hose couplings used for the transfer of fuel into receptacles, such as vehicle tanks. Generally, the hose coupling is received by an adapter on the receptacle to permit the transfer of liquid, such as a fuel, into the receptacle. It is common for such hose couplings and adapters to possess normally closed internal valves to prevent the escape of fuel when the hose coupling and adapter are not engaged but which are adapted to open in response to the mating or engagement of coupling with adapter. It is also common for the coupling and adapter to engage in a locked manner to prevent separation while the internal valves of both are open during fuel transfer.

An example of a hose coupling and adapter system including the features set out above is the liquid transfer apparatus described in U.S. Pat. No. 3,674,061 to E.R. Wiggins, Inc. In this instance, the hose coupling or nozzle and receptacle adapter are locked by an arrangement of locking pins in the nozzle which engage an annular groove in the adapter and are prevented from movement therefrom by a retaining collar. When fueling is complete and release of the hose coupling from the receptacle adapter is desired, a flexible wire handle is manually manipulated by the operator to release the nozzle from its locked position within the adapter.

U.S. Pat. No. 3,662,793, also issued to E.R. Wiggins, Inc., describes another liquid transfer apparatus comprising a hose coupling adapted to mate with a receptacle adapter, the engagement of which is also releasable by manipulating a flexible wire handle. On mating, the hose coupling and adapter are locked in a manner analogous to that described above. An arrangement of pivoted dog latches in the coupling, as opposed to locking pins, engage an annular groove in the adapter and are retained in the locked position by a retaining collar until manually released by manipulation of the wire handle.

A disadvantage of such prior systems lies in the fact that release of the hose coupling from the receptacle is a two-handed operation in which one hand is required to hold the coupling while the other hand is required to disable the locking mechanism engaging the coupling and adapter. This can be problematic in many circumstances. For example, in instances where access to the receptacle is restricted, one-handed operation of the hose coupling would clearly be advantageous. One-handed operation of the hose coupling would provide the operator with greater maneuverability to access the receptacle, hold open an access door or balance himself or herself, as needed. Moreover, the arrangement of the coupling handle and lock release mechanism commonly favours right-handed operation, making left-handed operation difficult, if possible at all.

There is a need, thus, for an improved hose coupling which can be disengaged from its mating adapter on a receptacle using only one hand, and which can be used ambidextrously.

SUMMARY OF THE INVENTION

Accordingly, an aspect of the present invention provides a hose coupling for a liquid transfer system, said coupling comprising a connector portion adapted to lockingly engage an adapter on a receptacle; and a handle portion, said handle being proximate to a releasing member which is oriented for manipulation by a hand holding the handle, said releasing member being moveable between a first engaged position in which the coupling is lockingly engaged with said adapter and a second disengaged position in which the coupling is released from locking engagement with said adapter, wherein said coupling is disengaged from locking engagement with said adapter when said release member is displaced from said first position to said second position.

The hose coupling of the present invention advantageously allows one-handed, ambidextrous operation by providing a member proximate to the handle of the coupling which is manipulable by a hand grasping the handle to release or disengage the hose coupling from the adapter when transfer of liquid is complete.

In another aspect of the present invention, there is provided an assembly comprising a hose coupling as set out above and a receptacle adapter.

These and other aspects of the present invention will be described in more detail herein by reference to the following figures in which:

BRIEF DESCRIPTION OF THE DRAWINGS

FIG. 1 is an elevated view, partly in section, of a hose coupling according to one embodiment of the present invention adjacent to a receptacle fill neck enclosing a mating adapter;

FIG. 2 is a longitudinal section of the hose coupling;

FIG. 3 is a partial longitudinal section of the downstream end of the coupling;

DETAILED DESCRIPTION OF THE INVENTION

Figure 4:
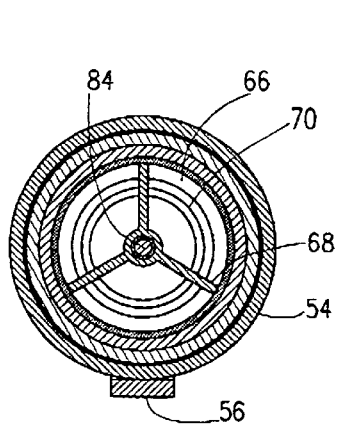
FIG. 4 is a transverse section taken along line 4—4 of FIG. 3.

A hose coupling 50 according to the present invention is illustrated in FIG. 1 alongside a receptacle 10 adapted to receive the coupling 50. The coupling 50 comprises a curved body 51 having an upstream handle portion 51a. The downstream end 51b of body 51 is linked to a connector portion 52 that functions to couple with an adapter in a receptacle. The connector portion 52 is encompassed by a latch sleeve 54. A release member 56 extends from and is integral with the latch sleeve 54.

With reference to FIG. 2, the latch sleeve 54 is concentrically slidable over the connector portion 52. Release member 56 is in sliding contact with a bearing pad 55, which is mounted on the underside of body 51, and is constrained against rotary motion relative to the axis of coupling 50 by a bearing pad support 57. The latch sleeve 54 forms an inward flange at its downstream end that contacts the outside surface of a barrel 72 and is constrained from axial motion in the downstream direction by a spring wire retaining ring 98 residing in a groove in barrel 72. The interior of the body 51 defines a conduit 59 for the transport of a liquid from a source of supply as seen in FIG. 2. A rotary gland nut 58 is retained in the body 51 at the upstream end of the handle portion 51a by a retaining ring 60, and leakage of liquid through the gland nut 58 is prevented by O-ring seals 62. The gland nut 58 is internally threaded to cooperate with the threaded end of a liquid supply hose (not shown). The rotary gland nut 58 allows axial rotation of the hose coupling 50 relative to a liquid supply hose enhancing the maneuverability of the coupling 50.

The downstream portion 51b of the body 51 extends to an inturned flange 53a and terminates with a short internally-threaded recess 53b. Recess 53b is threadably engaged with barrel 72 of the connector portion 52. The joint between barrel 72 and body 51 is hermetically sealed by O-ring gasket 64. The outer surface of barrel 72 extends from the threaded portion to an outwardly extending flange 96 and beyond to approximately the end of latch sleeve 54.

The interior of barrel 72 is best illustrated in FIG. 3. A spider 68, comprising a central hub and a plurality of radially disposed ribs (shown in FIG. 4), is secured against the downstream face 69 of flange 53a by the clamping action of barrel 72 transferred through clamping ring 66. The central hub of the spider is axially bored and threaded to receive a correspondingly threaded extension of poppet 84. From its threaded portion, the poppet 84 extends as a cylinder, in the downstream direction, flaring outwardly in frusto-conical fashion to another much shorter cylindrical part which is grooved to provide a retaining recess for O-ring seal 76. The poppet 84 terminates with a further short frusto-conical surface 86.

The inner wall 88 of barrel 72 defines a cylindrical cavity 90 containing a hollow piston 74. The exit port of piston 74 is flared to form a frusto-conical chamber in which the terminal surface 86 of poppet 84 normally resides. Compression spring 70 is seated concentrically at its upstream end on the ribs of spider 68 and at its downstream end is constrained in cavity 92 within piston 74 such that piston 74 is forced to remain in intimate contact with poppet 84. O-ring seal 76, between poppet 84 and piston 74 surfaces, and O-ring seal 94, between the outer surface of piston 74 and the inner wall 88 of barrel 72, provide hermetic sealing of applicable parts to constitute a normally closed valve at the downstream end of coupling 50. Inner wall 88 extends in the downstream direction beyond hollow piston 74 and is grooved to provide a retaining recess for an additional O-ring seal 80.

Figure 8:
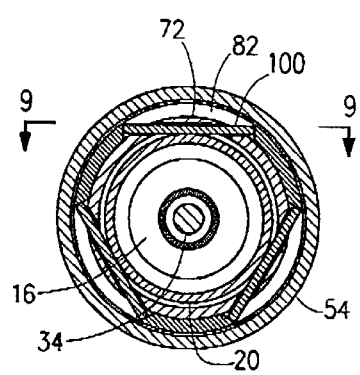
FIG. 8 is a transverse section taken along line 8—8 of FIG. 7.

A compression spring 78 is in contact with barrel flange 96 at one end and forcibly contacts a pin cage 82 at the other end, pressing the pin cage against the flanged edge 54a of latch sleeve 54. A plurality of chordal latch pins 100 are nested in an array in pin cage 82 as shown in FIG. 8. Slots 102, equal in number and circumferential disposition to latch pins 100 are cut in barrel 72, each on an inclined plane extending axially along the barrel and radially inward with respect to its axis so that each forms a ramp on which the corresponding latch pin may be urged by pressure from pin cage 82 and spring 78. As one of skill in the art will appreciate, latch pins 100 may be substituted by any other appropriate latching means such as, for example, pivoted dog latches and the like.

Figure 5:
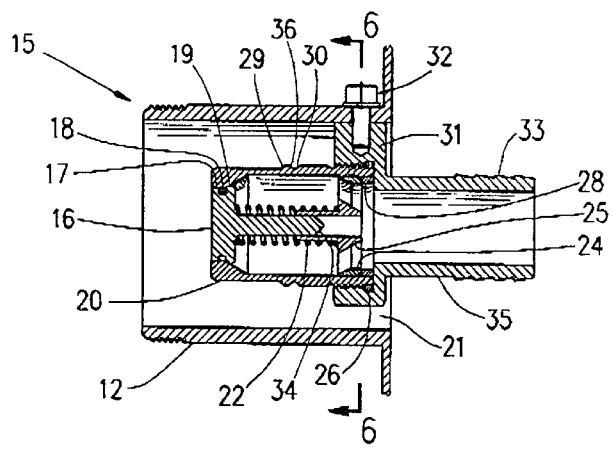
FIG. 5 is a longitudinal section of the fill neck and mating adapter.
Figure 6:
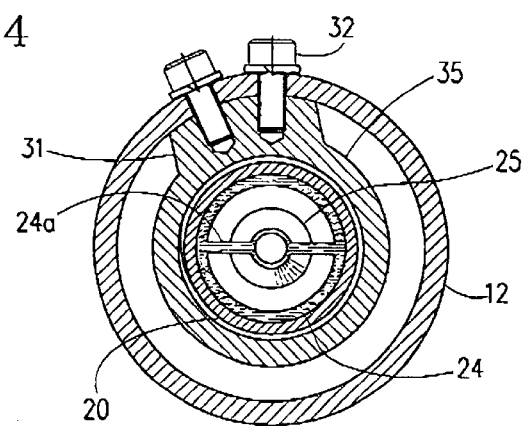
FIG. 6 is a transverse section taken along line 6—6 of FIG. 5.

An adapter 15, as would be found in a receptacle such as a tank, is shown in FIG. 5. The adapter 15 comprises a valve body 20 and a bracket 35 to which it is threadably engaged. The valve body 20 and bracket 35 are hermetically sealed by O-ring gasket 26. The bracket 35 is generally cylindrical in form, defining a generally annular cavity 21 around valve body 20 within fill neck 12. Bracket 35 is securely attached to fill neck 12 by fastening means 32 which cooperate with a single radially disposed lug 31 on bracket 35 (See FIG. 6). Downstream of valve body 20, bracket 35 forms a narrower cylinder which sits on the interior of a receiving tank, for example. The downstream exterior surface of bracket 35 may optionally be adapted for connection to a hose. As shown in FIG. 5, this surface may consist of a plurality of barbs 33, such as those commonly used in conjunction with a flexible hose and hose clamp to provide a hermetically sealed connection. Alternatively, this surface may be threaded. However, as will be appreciated by one of skill in the art, there is no requirement for a hose connection to bracket 35.

Support ring 24 and spacer 28 nest within valve body 20 at its downstream end. A plurality of ribs 24a (shown in FIG. 6), integral with support ring 24, suspend a central boss 25. A stem 34 situated centrally within valve body 20 supports a poppet head 16 at its upstream end and is slidably seated within boss 25 at its downstream end. The poppet head 16 has a cylindrical outer surface 17 that is grooved to retain O-ring seal 18 and an inner surface that is flared outward in frusto-conical fashion to form surface 19. The internal surface of valve body 20 is proportioned to provide a close sliding relationship with poppet surfaces 17 and 19. A compression spring 22 urges the poppet head against the upstream end of valve body 20 constituting a normally closed valve at the upstream inlet end of valve body 20.

An annular groove 30 formed in about the middle of the outer surface of valve body 20 is dimensionally adapted to receive latch pins 100 of hose coupling 50. Sloping flank 36 of groove 30 and sloping shoulder 29 adjacent to groove 30 serve to deflect or lock the latch pins as will be described in more detail.

Figure 7:
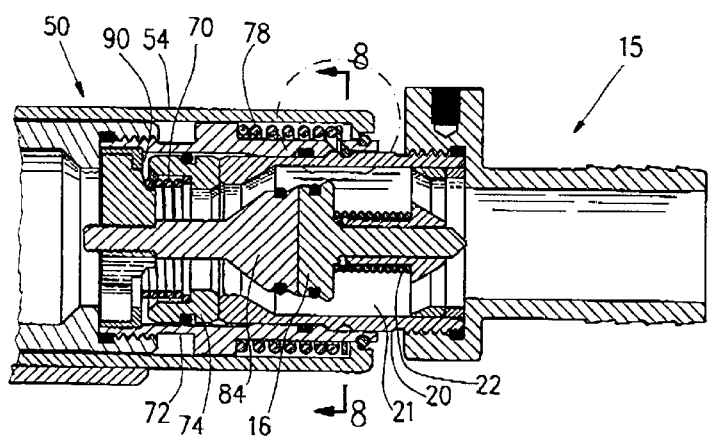
FIG. 7 is a partial longitudinal section of the coupling engaged with the adapter.
Figure 9:
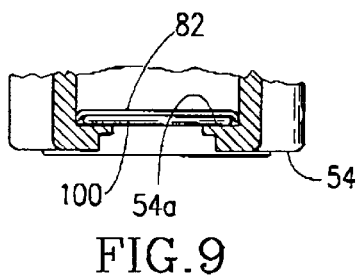
FIG. 9 is a partial enlarged sectional view taken along line 9—9 of FIG. 8.
Figure 10:
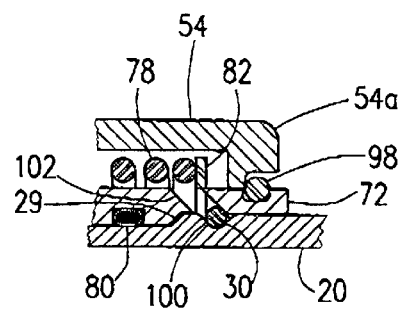
FIG. 10 is an enlarged view of the area enclosed by the dotted line in FIG. 7.
Figure 11:
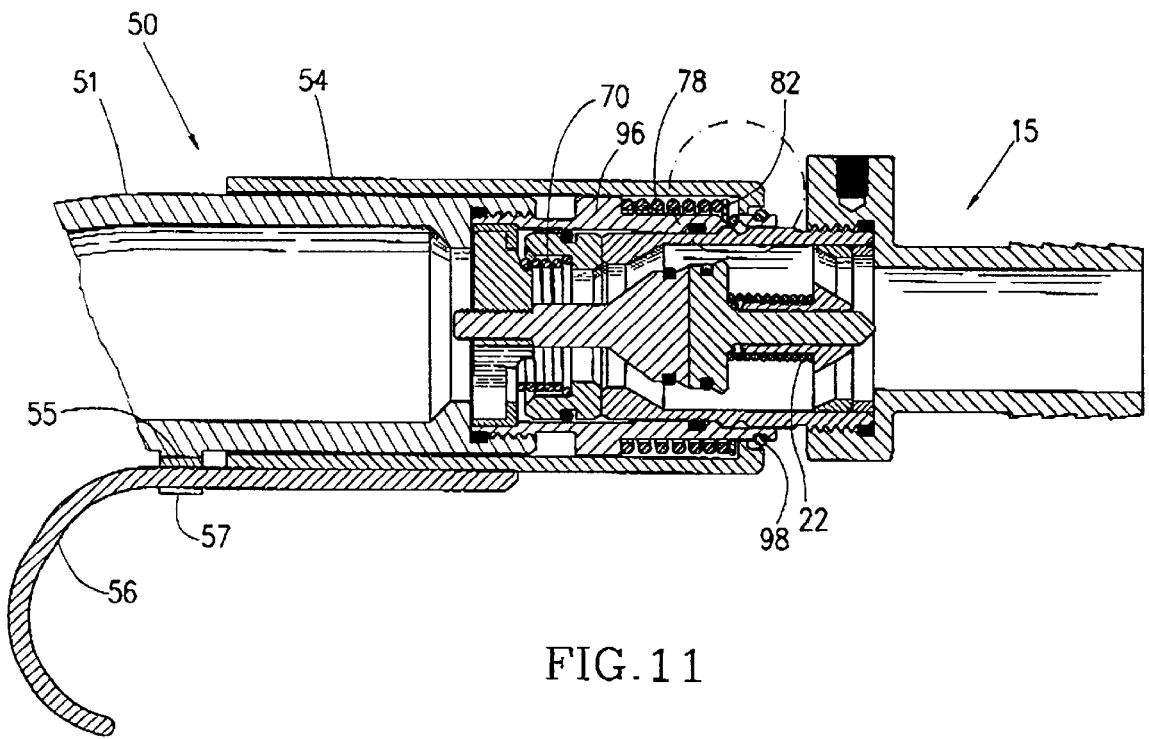
FIG. 11 is a partial longitudinal section of the coupling engaged with the adapter in which the latch sleeve has been displaced upstream in order to disengage the coupling and adapter.

FIG. 7 illustrates coupling 50 and adapter 15 in locked engagement. As valve body 20 of adapter 15 penetrates barrel 72 of the connector portion 52 of coupling 50, the latch pins 100 deflect radially when they contact sloping shoulder 29 of valve body 20. This causes latch pins 100 to move outward along the flanks of slots 102, displacing pin cage 82 and compressing spring 78. On further penetration by valve body 20, the force of compression spring 78 applied against pin cage 82 causes the pin cage to urge the latch pins into groove 30 (See FIG. 10), thereby preventing axial displacement of coupling barrel 72 with respect to valve body 20. In this arrangement, coupling 50 and adapter 15 are said to be lockingly engaged. Spring 78, acting through pin cage 82, causes the extremities of the latch pins 100 to be held in contact with the inturned flange 54a of the latch sleeve 54 as shown in FIG. 9. Separation of the parts is prevented by the interaction between latch pins 100 and the opposing flanks of groove 30 and slots 102.

With further reference to FIG. 7, it is seen that the nose of valve body 20 is in contact with hollow piston 74 which has been displaced to a position at the upstream end of cavity 90, concurrently compressing spring 70. Simultaneously, the face of poppet 84 of coupling 50 comes in contact with poppet head 16 of adapter 15 causing compression of spring 22. Full penetration of the coupling barrel by the valve body results in an open conduit through cavity 90 and cavity 21 which allows the passage of liquid from coupling 50 through adapter 15 to a receptacle such as tank 10.

Figure 12:
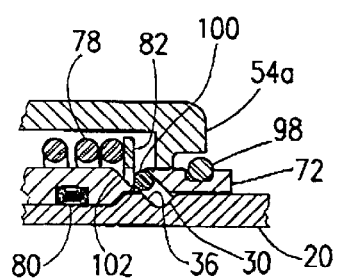
FIG. 12 is an enlarged view of the area enclosed by the dotted line in FIG. 11.

To disengage coupling 50 from the adapter 15 of a receptacle, an operator using the hand holding the handle-like portion 51*a* of coupling 50 can manipulate release member 56 from the engaged position in which the coupling 50 and adapter 15 are lockingly engaged to a disengaged position in which the coupling 50 and adapter 15 are released from locking engagement. This action will displace latch sleeve 54 a short distance in the upstream direction, as shown in FIG. 12, allowing latch pins 100 to be urged axially and consequently radially outward along flank 36 of groove 30 until the latch pins 100 are clear of the outer extremity of flank 36. In this position, latch pins 100 no longer prevent axial displacement of coupling barrel 72 with respect to valve body 20 and springs 70 and 22 cooperate to urge coupling 50 and adapter 15 to revert to their uncoupled state with the aforementioned valves residing in their normally closed state.

The present hose coupling can be utilized in standard liquid transfer systems which generally accommodate hose pipes having an inside diameter of approximately between ¾ inch (20 mm) and 2 inches (50 mm). As will be appreciated, however, practical consideration must be given to parameters such as weight, including the weight of the coupling and any attachments including the hose, as well as the fluid static pressure, in order to determine the suitability of the present coupling in any given liquid transfer system.

It will be understood by those of skill in the art that the specific embodiments described herein are illustrative of the present invention only and other embodiments are possible that are within the scope of the invention as defined in the attached claims. Moreover, in the description of the embodiments, one of skill in the art will further appreciate that non-essential elements can readily be substituted with elements that perform the same function. For example, the term "fastening means" as it is used herein is meant to encompass screws, bolts, pins and any other means useful to fasten two or more parts together as would be appreciated by one of skill in the art. Likewise, the springs referred to herein may be substituted by any other appropriate biasing means. By reference to O-ring seals and the like, it will be appreciated that any appropriate sealing means could be substituted.

We claim:

1. A hose coupling for a liquid transfer system, said coupling comprising: a connector portion adapted to lockingly engage with an adapter of a receptacle; and a handle portion, said handle being proximate to a releasing member which is oriented for one-handed manipulation by a hand holding said handle portion, said releasing member being moveable between a first engaged position in which the coupling receives and lockingly engages said adapter and a second disengaged position in which the coupling is released from locking engagement with said adapter, wherein said coupling is disengaged from locking engagement with said adapter when said release member is displaced from said first position to said second position; wherein said coupling comprises radially deflectable latch pins adapted to lockingly engage grooves formed in the adapter on entry of the adapter into the coupling.

2. A hose coupling as defined in claim 1, comprising a valve which is closed to liquid transfer when said coupling is disengaged from said adapter and open to liquid transfer when said coupling is engaged with said adapter.

3. A hose coupling as defined in claim 1, wherein said latch pins are released from locking engagement with said adapter by displacement of said release member from said first to said second position.

4. A hose coupling and receptacle adapter assembly for a liquid transfer system comprising: a receptacle adapter; and a hose coupling for a liquid transfer system, said coupling comprising: a connector portion adapted to lockingly engage an adapter on a receptacle; and a handle portion, said handle being proximate to a releasing member which is oriented to allow one-handed manipulation by a hand holding the handle, said releasing member being moveable between a first engaged position in which the coupling receives and lockingly engages said adapter and a second disengaged position in which the coupling is released from locking engagement with said adapter, wherein said coupling is disengaged from locking engagement with said adapter when said release member is displaced from said first position to said second position;
wherein said coupling comprises radially deflectable latch pins adapted to lockingly engage the adapter on entry of the adapter into the coupling and said adapter comprises a groove adapted to receive said latch pins when the coupling and adapter are lockingly engaged.

5. An assembly as defined in claim 4, wherein each of said receptacle adapter and said hose coupling comprise a valve closed to liquid transfer when disengaged from one another and open to liquid transfer when lockingly engaged with one another.

6. An assembly as defined in claim 4, wherein said latch pins are released from locking engagement with the groove of said adapter by displacement of the release member from said first to said second position.

7. A hose coupling for a liquid transfer system, the coupling comprising a connector portion having a latch member adapted to engage the connector portion onto an adapter when axial force is applied to the connector portion and to lockingly engage the adapter, and a handle portion, said handle portion being proximate to a releasing member for the latch member which is oriented for one-handed manipulation by a hand holding said handle portion, the releasing member being moveable by the handle portion between a first engaged position in which the connector portion is received in and lockingly engaged in the adapter and a second disengaged position in which the connector portion is released from the adapter, and sealing means provided between the adapter and the connector portion to provide a closed valve when the releasing member is in the first engaged position.

8. A hose coupling as defined in claim 7, comprising a valve which is closed to liquid transfer when said connector portion is disengaged from said adapter and open to liquid transfer when said connector portion is engaged with said adapter.

9. A hose coupling as defined in claim 7, wherein said latch member comprises radially deflectable latch pins adapted to lockingly engage the adapter on entry of the adapter into the connector portion.

10. A hose coupling as defined in claim 7, wherein said latch pins are released from locking engagement with said adapter by displacement of said release member from said first to said second position.

11. A hose coupling and receptacle adapter assembly for a liquid transfer system comprising: a receptacle adapter; and a hose coupling for a liquid transfer system, said coupling comprising: a connector portion having a latch member for lockingly engaging a receptacle adapter and a handle portion, said handle being proximate to a releasing member which is oriented to allow one-handed manipulation by a hand holding the handle portion, said releasing member being moveable between a first engaged position in which the adapter receives and lockingly engages the latch member of the coupling when axial force is applied to the connector portion and a second disengaged position in which the latch member is released from locking engagement with said adapter and said coupling is disengaged from locking engagement with said adapter and said coupling is disengaged from locking engagement with said adapter when said release member is displaced from said first position to said second position.

12. An assembly as defined in claim 11, wherein each of said receptacle adapter and said hose coupling comprise a valve closed to liquid transfer when disengaged from one another and open to liquid transfer when lockingly engaged with one another.

13. An assembly as defined in claim 11, wherein said latch member comprises radially deflectable latch pins on the connector portion adapted to lockingly engage a groove in the adapter when the coupling and adapter are lockingly engaged.

14. An assembly as defined in claim 11, wherein said latch pins are released from locking engagement with the groove of said adapter by displacement of the release member from said first to said second position.

* * * * *